March 11, 1924.  1,486,332
J. F. HALVERSON
STREET INDICATING DEVICE
Filed Oct. 10, 1921  4 Sheets-Sheet 2
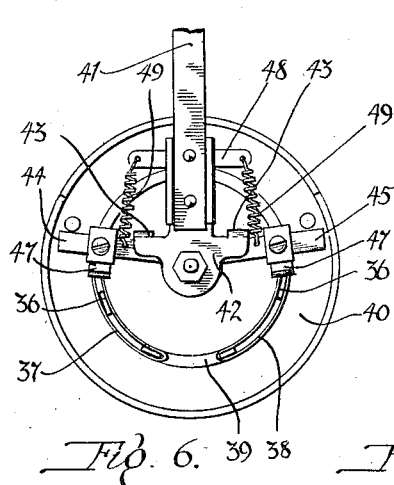
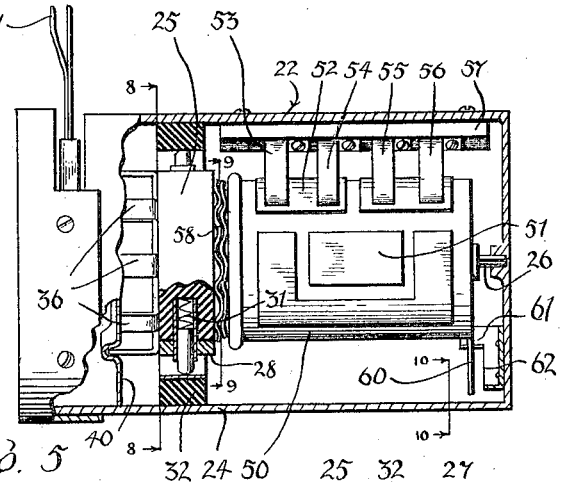
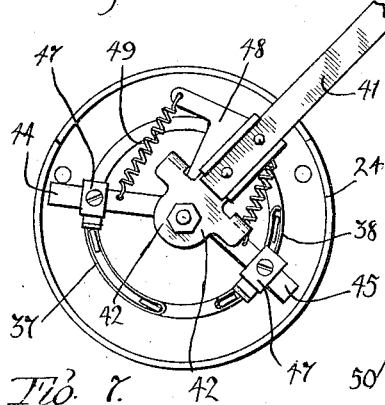
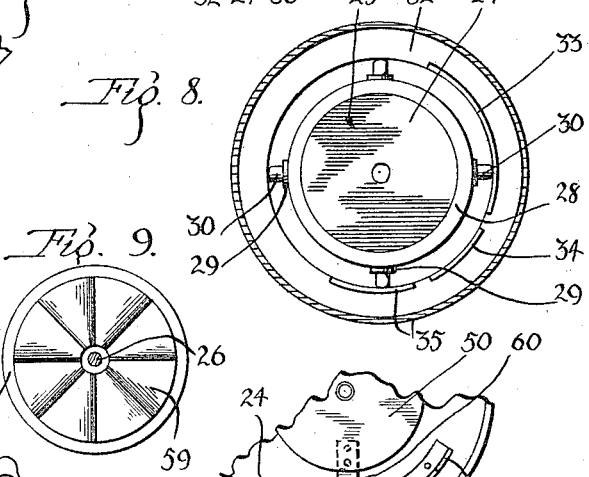
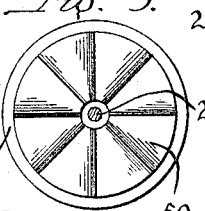
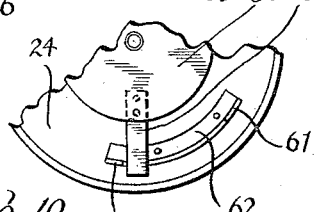
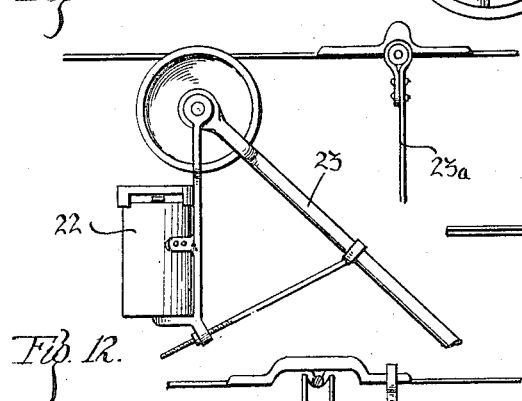
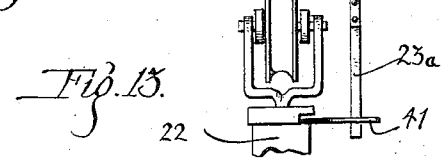
INVENTOR
John F. Halverson
BY
ATTORNEYS

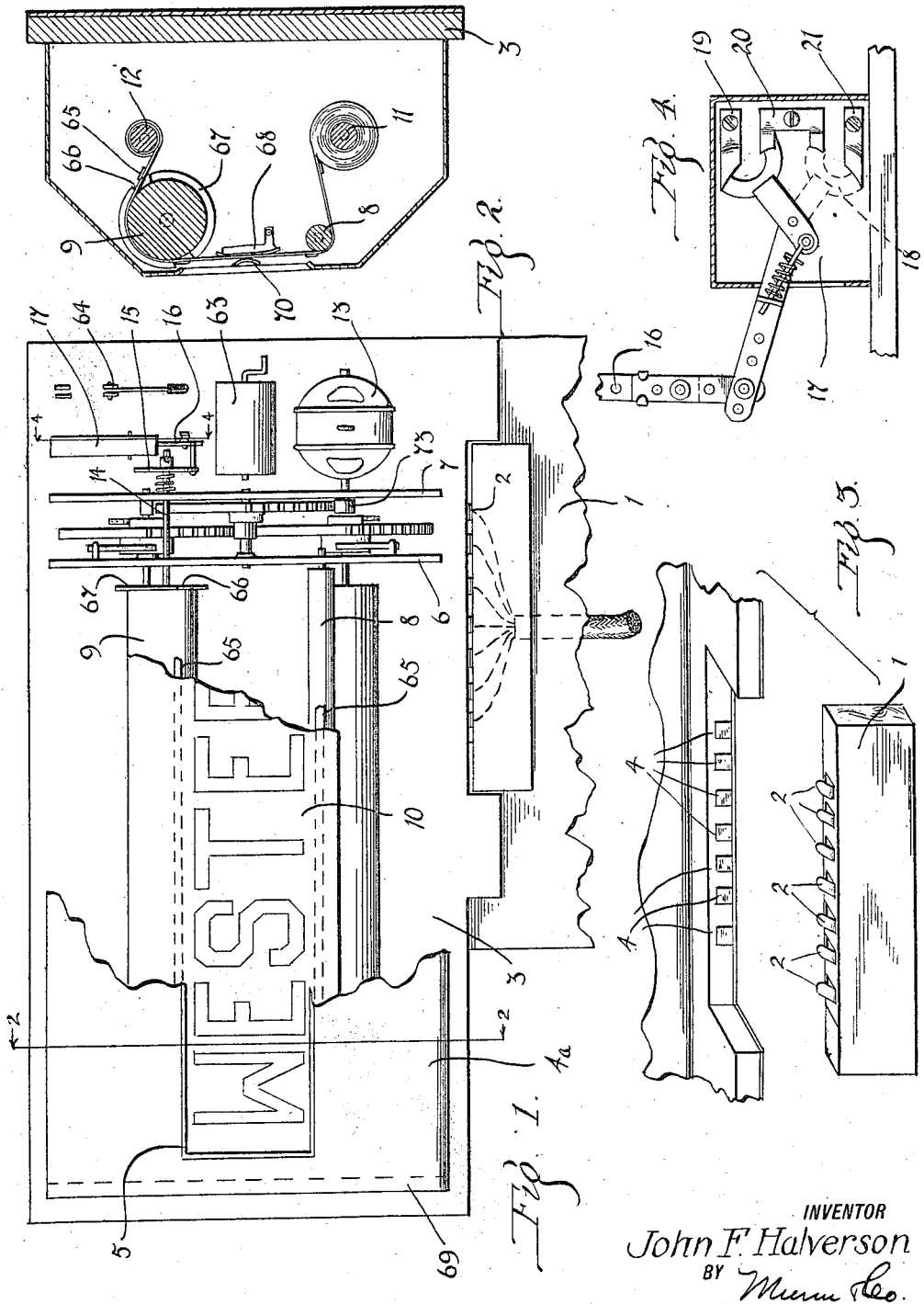

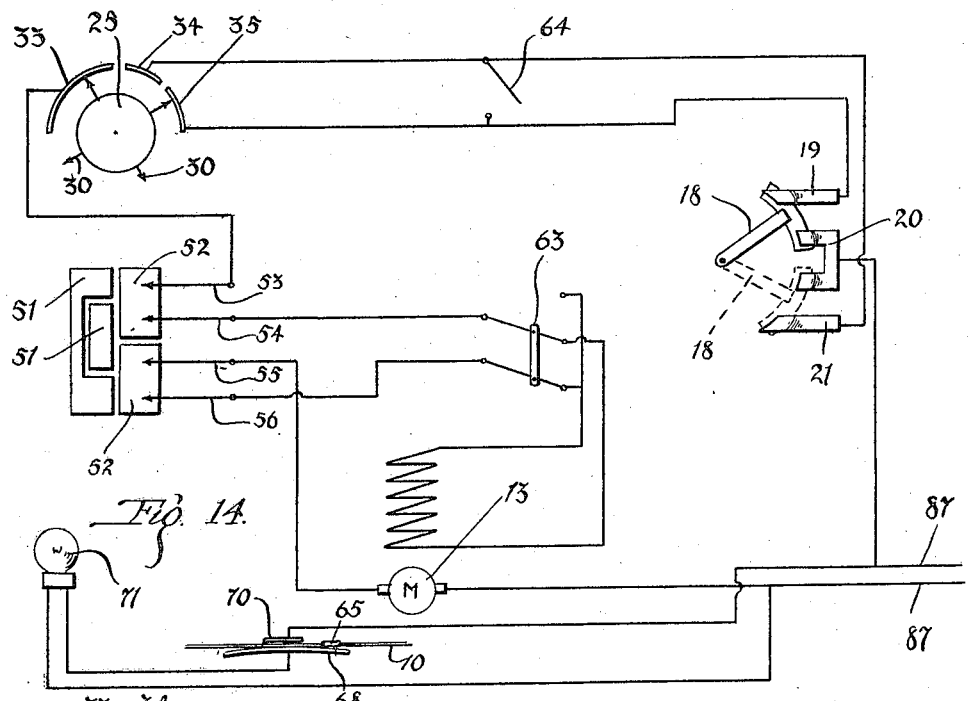
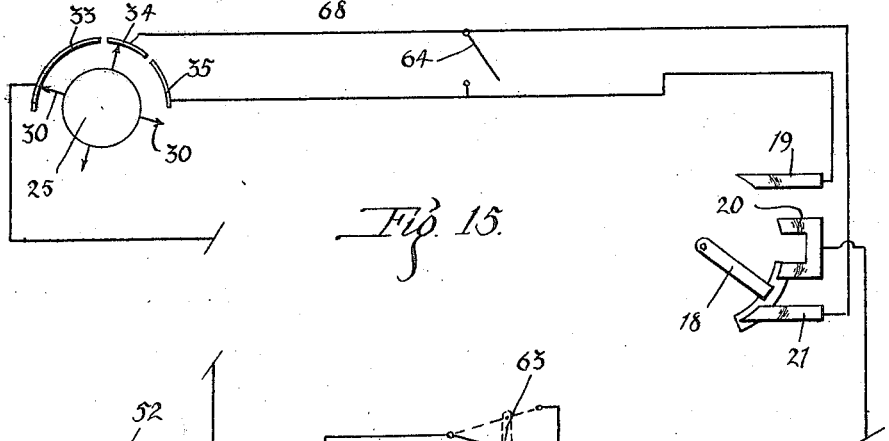
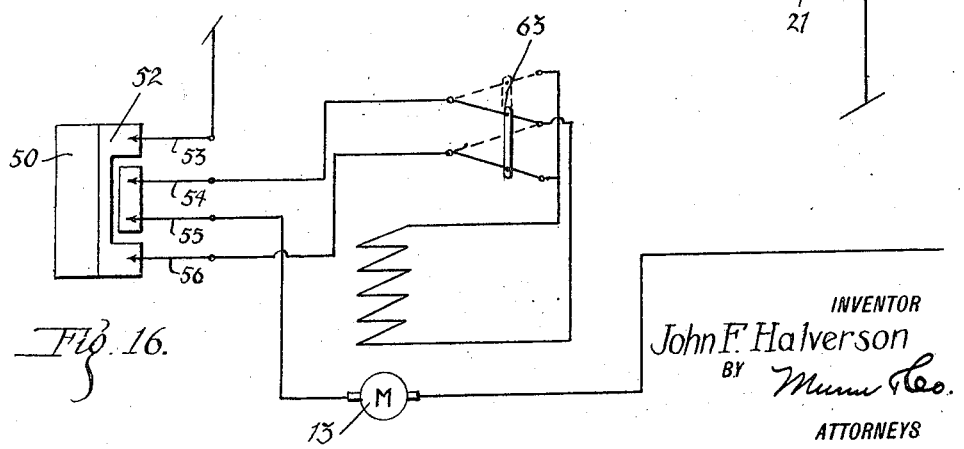

March 11, 1924. 1,486,332
J. F. HALVERSON
STREET INDICATING DEVICE
Filed Oct. 10, 1921 4 Sheets-Sheet 4
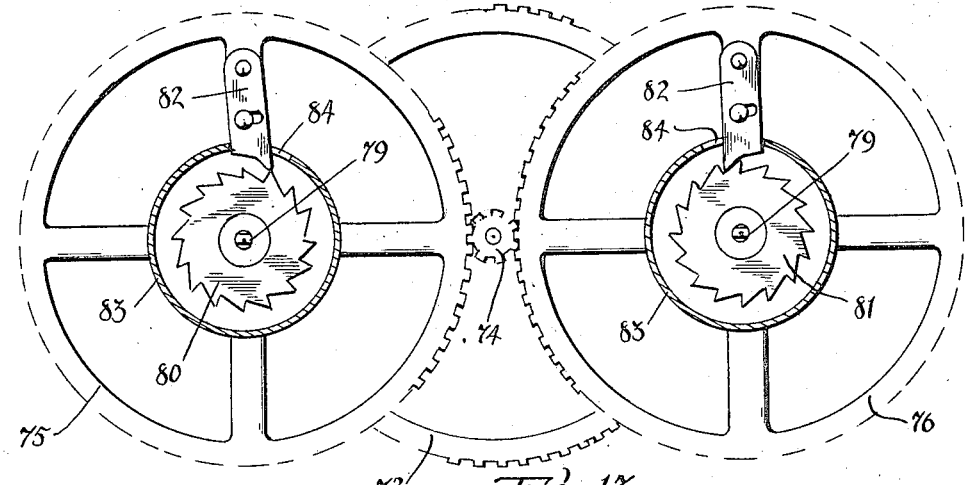
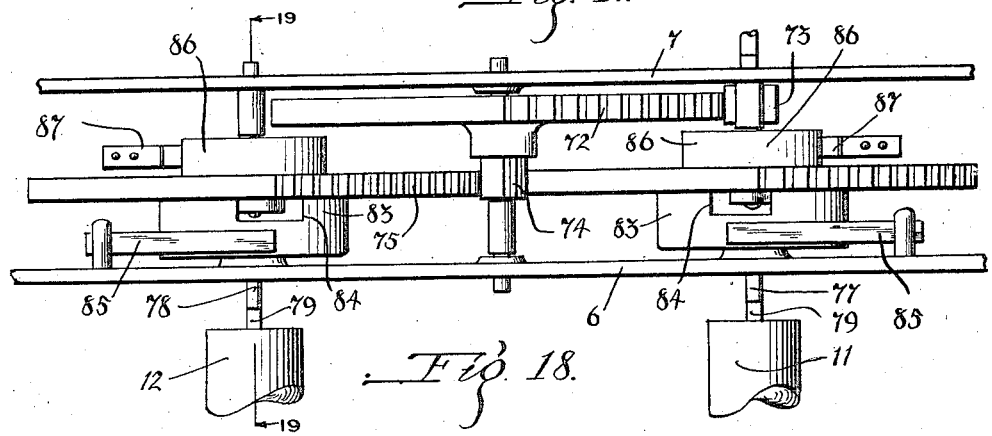
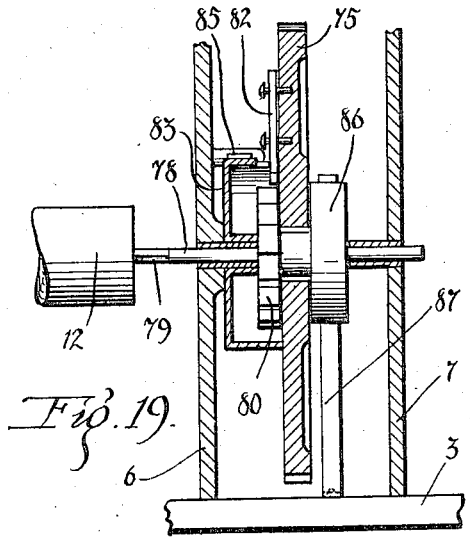
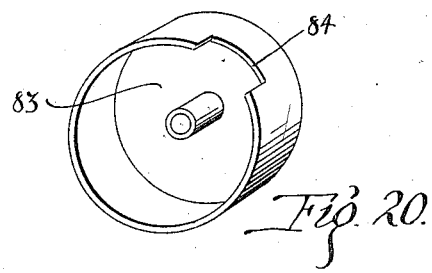
INVENTOR
John F. Halverson
BY
ATTORNEYS Patented Mar. 11, 1924.

1,486,332

UNITED STATES PATENT OFFICE.

JOHN F. HALVERSON, OF MADISON, WISCONSIN, ASSIGNOR OF ONE-HALF TO CHARLES E. FRIDAY, OF MADISON, WISCONSIN.

STREET-INDICATING DEVICE.

Application filed October 10, 1921. Serial No. 506,741.

*To all whom it may concern:*

Be it known that I, JOHN F. HALVERSON, a subject of the King of Norway, and a resident of Madison, in the county of Dane and State of Wisconsin, have invented a new and useful Improvement in a Street-Indicating Device, of which the following is a full, clear, and exact description.

My invention relates to street indicating devices, and it consists in the combinations, constructions and arrangements herein described and claimed.

An object of my invention is to provide a device of the character described which will automatically indicate to passengers on a train or car the stop to which the train or car is approaching.

A further object of my invention is to provide a device of the character described which will turn back the indicating means when the train or car is backed up temporarily, thus preventing the device from becoming out of time with the road upon which it is passing.

A further object of my invention is to provide a device of the character described having automatically operated means for progressively bringing names in exact registration with an opening provided in a casing which encloses a part of the device.

A further object of my invention is to provide a device of the character described in which the indicating rolls may be turned forward or back to register with the station or stop at which the device is placed in the train or car.

A further object of my invention is to provide a device of the character described which gives a visible signal to motormen when the train or car approaches a railroad or other dangerous crossing.

Other objects and advantages will appear in the following specification, and the novel features of the invention will be particularly pointed out in the appended claims.

My invention is illustrated in the accompanying drawings, forming part of this application, in which—

Fig. 1 is a front elevation with the casing and a part of the indicating belt broken away, Fig. 2 is a section view along the line 2—2 of Fig. 1, Fig. 3 is a fragmentary view of the device, showing the electrical connecting means, Fig. 4 is a section of the auxiliary two-way switch along the line 4—4 of Fig. 1, Fig. 5 is a side elevation of the trolley switch with a part of the casing and the internal mechanism broken away, Fig. 6 is a top plan view of the trolley switch with the cover removed, Fig. 7 is a top view of the trolley switch with the cover removed and the lever in operation, Fig. 8 is a sectional view of a trolley switch along the line 8—8 of Fig. 5, Fig. 9 is an end view of the rotor along the line 9—9 of Fig. 5, Fig. 10 is a view of the rotor stop from the line 10—10 of Fig. 5, Fig. 11 is a partial view of the trolley switch lever, Fig. 12 is a side elevation of the trolley switch operatively applied to a trolley, Fig. 13 is a front elevation of the trolley switch operatively applied to a trolley, Fig. 14 is a diagrammatic view of the electrical connections of the device, Figures 15 and 16 are diagrammatic views of a part of the electrical connections of the device, Fig. 17 is a sectional view of a part of the mechanism illustrated in Fig. 18, Fig. 18 is a top plan view of the roller, clutch mechanism, Fig. 19 is a partial section along the line 19—19 of Fig. 18, Fig. 20 is a perspective view of a part of the roller, clutch mechanism.

In carrying out my invention, I make use of a mounting board 1, which is secured at one end of a car and is provided with a plurality of spring contact members 2. These contact members are connected to various parts of the device, as will be hereinafter disclosed. The indicating mechanism of the device is secured to a panel 3 having contact members 4 which are arranged to register with the contact members 2 of the mounting board 1.

Supported on the panel 3 is a casing 4ª having a substantially rectangular opening 5. Within the casing 4ª and supported at one end by means of uprights 6 and 69 are rollers 8 and 9 arranged to carry a belt 10 of fabric, or other suitable material, upon which names designating streets or stations are inscribed. The names on the belt 10 are of such proportion that they may be viewed one at a time through the opening 5 when the belt is moved relative to the opening.

The rollers 8 and 9 act only as idle or guide rollers. Rollers 11 and 12 are provided and are also supported by means of the uprights 6 and 69 for moving the belt 10 so that the names thereon may be read through the opening 5, the belt 10 being wound from one roller to another. Means for driving the rollers 11 and 12 is provided in an electric motor 13 and a clutch mechanism, the construction of which will be hereinafter described. It should be noted at this time that if current is supplied to the motor 13, one of the rollers 11 or 12 will turn and cause the belt 10 to move relative to the opening 5 and that if the motor is reversed, the opposite roller will turn and the belt will move in the opposite direction.

Means for causing the belt 10 to move a given distance when current is supplied to the motor, is provided by an extended shaft 14 of the roller 9, the shaft 14 having at its end an eccentric wheel 15, to which a rod or strap 16 is attached, and which in turn operates an auxiliary two-way switch 17. It will be seen therefore that at every half turn of the roller 9, the switch 17 is operated and shuts off current flowing to the motor. The roller 9 is of such dimension that a half of its circumference is equal to the width of the opening 5. It will thereupon be seen that each time the motor drives the roller 11 or 12 that a new name will be brought to registration with the opening 5.

Referring now to Fig. 4, the auxiliary two-way switch 17 is so constructed that when the arm 18 is in the position shown in Fig. 4, current may flow between the terminals 19 and 20. If the motor is now operated to cause the belt to move forward or back when one-half turn of the roller 9 has been made, the switch 17 will operate and the arm 18 will assume the position shown in dotted lines. This will break the circuit between the terminals 19 and 20 and, as reference to Fig. 14 will show, the motor will cease to operate, leaving the belt in its new position. If now, current is allowed to flow to the motor, only through the terminals 20 and 21, as it previously had been directed through the terminals 19 and 20, the motor would again operate and the belt 10 would be moved to a new position. When the belt 10 had assumed its new position, the switch 17 would operate and the motor would again be shut off until such time as current to the motor could be directed through the terminals 19 and 20.

Means for directing current to the motor through the terminals 19 to 20 and 20 to 21, selectively, is provided in a switch which I shall describe as the trolley switch 22. The trolley switch 22 is adapted to be secured upon a trolley pole 23. Means for operating the switch 22 is provided in a downwardly extending trip lever 23ª secured to a cross wire of the trolley line, adjacent the station or street to be indicated. With reference to Fig. 5, it will be noted that the trolley switch 22 is contained in a casing 24 and consists in a rotor 25 rotatably mounted on a shaft 26, which shaft is keyed or otherwise secured to the casing 24. The rotor 25 is composed of a central body of insulating material 27 having a metal conducting ring 28. Within the ring 28 are mounted four sleeves 29. The sleeves 29 extend up into the body 27 of the rotor and are placed 90° apart upon the circumference thereof. Within the sleeves 29 are disposed contacting members 30 and springs 31 for pressing the contact members outwardly from the sleeve 29. The rotor 25 is disposed within a ring 32 of insulating material, which ring is provided with a contact surface 33 extending approximately 90° of the inner surface of the ring and two smaller contact surfaces 34 and 35 adjacent one end of the contact surface 33 and each extending approximately 45° along the inner surface of the ring 32. The rotor 25, together with the contact surfaces 33, 34 and 35 comprises a two-way switch, and should be considered as such especially in its relation with the auxiliary two-way switch 17. Means for rotating the rotor 25 is provided in a plurality of outwardly extending arms 36, which arms are securedly fastened to the rotor 25. In the present case, I employ eight of the arms 36. These arms 36 are arranged to extend through grooves 37 and 38 of a raised portion 39 in a metal partition 40 of the casing 24.

Means for moving the rotor by use of the arms 36 is provided in a lever 41 which is pivotally mounted to the shaft 26 by a member 42. The member 42 has two downwardly extending projections 43. Beneath the member 42 and rotatable on the shaft 26 are two short lever arms 44 and 45 carrying pawls 47. These pawls are arranged to engage the portions of the arms 36 which extend through the grooves 37 and 38. A T-shaped member 48 is also rotatably mounted on the shaft 26 and carries two tension springs 49, which are connected, one to each of the lever arms 44 and 45.

When the lever 41 is moved 45°, as reference to Fig. 7 will show, the projection 43 will engage the short lever arm 45 and cause the pawl 47 to move one of the arms 36 along the grooves 37 or 38 until the rotor 25 is turned approximately 45°.

A second rotor 50 is rotatably mounted on the shaft 26 and carries two sets of contact plates 51 and 52. Spring contact members 53, 54, 55 and 56 are insulated from one another and secured to a bar 57 of fibre or other suitable material. This bar is securely fixed to the casing 24. The rotor 50 has frictional engagement with the rotor 25 by means of plates 58 and 59. The plate 58 is secured to the rotor 25 and the plate 59 to the rotor 50. The surface contour of these plates are clearly shown in Fig. 9. It will be seen therefore that when the rotor 25 is turned to the left or right, that the rotor 50 will turn with it unless otherwise held back. The rotor 50 is provided with an outwardly extending arm 60 which lies between outwardly extending projections 61 of a stop plate 62. The plate 62 is secured rigidly to the casing 24 and the distance between the projections 61 is of such proportion as to limit the travel of the rotor 50 to an arc of 45°.

Contact plates 51 and 52 mounted on the rotor 50, together with the four spring contacts 53 to 56 inclusive, comprise a reversing switch mechanism which is arranged to operate by the turning of the rotor 50 through an arc of 45°. The limitation of the turning of the rotor to bring about a reversing effect, is made possible by the plate 62 and the arms 60, previously described.

Mounted on the panel 3 and adjacent the auxiliary two-way switch previously described, I have provided additional reversing switch 63 which is arranged to be operated manually and, as reference to Fig. 14 will show, is connected so that the motor 13 may be reversed at will regardless of the position of the reversing switch contained in the trolley switch mechanism 22.

A single-pole knife-switch 64 is provided also on the panel 3 adjacent the reversing switch 63 and is used, as reference to Fig. 4 will show, to render the switch 17 inactive. This makes possible the advancing of the belt 10 to any desired position.

I have provided on the belt 10 transverse metal stiffening strips 65, which strips are spaced intermediate the names inscribed on the belt. The strips 65 extend beyond the edges of the belt 10 and are adapted to engage notches 66 in the flange 67 of the roller 9, thus providing means of synchronizing the roller 9 with the names inscribed on the belt 10 so that when the names are directly in registration with the opening 5, the roller 9 carrying with it the eccentric wheel 15 will cause the auxiliary two-way switch 17 to operate and shut off current to the motor 13. This will leave a name on the belt 10 in registration with the opening 5 until such time as the motor is again started by means of the rotor 25 in the trolley switch previously described.

A stationary contact 68 is secured to the upright 69 of the panel 3 and is arranged so that the extended portion of the strips 65 will engage it as the belt 10 is moved. Above the stationary contact 68 is a spring contact 70 which is adapted to press the strips 65 in close engagement with the stationary contact 68. Ordinarily, the extended portions of the springs 65 are insulated, but on stations or stops adjacent railroad or other dangerous crossing, the insulated material is removed from the ends of the strips and as they pass between the stationary contact 68 and the spring 70, a circuit therebetween is closed and current allowed to flow from a power source to a lamp 71 which is placed so that the motorman or engineer will see it, and thus be advised of the danger ahead.

Referring now to the roller on which the belt 10 is wound, it will be noted that a special clutch mechanism is necessary in view of the fact that the size of the rollers vary as the belt 10 is wound and unwound therefrom. That is, if the roller 11 has most of the belt 10 wound thereon, as reference to Fig. 2 shows, and the roller 12 is revolving to feed the belt 10 from the roller 11 up past the opening 5, some means of allowing the roller 11 to slip relative to the revolving driving means must be provided. This means is provided by a clutch mechanism illustrated in Fig. 17, in which the central driving wheel 72 is geared directly to a gear 73 upon the shaft of the motor 13. A smaller gear 74 is attached to the driving gear 72 and meshes with two larger gear wheels 75 and 76. The gear wheels 75 and 76 are rotatably mounted upon spindles 77 and 78 of special construction. The spindles 77 and 78 are provided with angular terminals 79 which are adapted to engage angular recesses in the rollers 11 and 12, respectively.

Ratchet wheels 80 and 81 form a part of the spindles 77 and 78 and are arranged to lie adjacent one face of the gear wheels 75 and 76. The gear wheels 75 and 76 each have pivotally mounted on one of the spokes thereof pawls 82. These pawls are brought into engagement with the spindles 77 and 78 by means of shells 83, which shells have frictional engagement with the gear wheels 75 and 76. The shells 83 are provided with notched portions 84 adjacent the face of the gear wheels, which are adapted to receive the pawls 82. Drag springs 85 are provided to bear against the shells 83. The spindles 77 and 78 have disposed on the opposite side of the gear wheels 75 and 76 enlarged portions 86. These enlarged portions are for the purpose of providing, along with the springs 87, which bear against them, a drag for the spindles 77 and 78 carrying the rollers 11 and 12, respectively.

From the foregoing description of the various parts of the device, the operation thereof may be readily understood. The indicating panel 3 having been properly fixed to the mounting board 1, thus securing electrical connections to the panel 3 through the contacts 2 and 4 is in readiness for the operation thereof. The knife switch 64 should be opened, which permits the auxiliary two-way switch 17 to act when the roller 9 is turned. The trolley switch is properly-mounted upon the trolley pole, as reference to Figures 12 and 13 will show.

Let us assume that the electrical connections at this time are as shown in Fig. 14 and that the rotor 25 of the trolley switch has just been turned 45° by the passing of the trolley switch 22 past the trip 23ª, thus moving the rotor 25 to the position indicated in Fig. 14. Current will now enter through the power leads 87, bridge the blade carried by the arm 18 of the switch 17 and pass through the contacts 30 of the rotor 25 from the contact surface 35 to the contact surface 33 and flow down through the reversing switch of the rotor 50 to the motor 13. One of the rollers 11 or 12 will thus be driven, depending, as reference to the clutch mechanism will show, upon the direction in which the motor turns. Assuming that the roller 12 is driven, the roller 11, being allowed to idle with the drag spring 87 to hold the belt 10 taut, the belt 10 will now move upwardly over the roller 9 until the roller 9 has revolved 180° at which time a new name has appeared in the opening 5 and the auxiliary two-way switch 17 has operated and thrown the arm 18 carrying the switch blade to the position shown in dotted lines in Fig. 14. A movement of the rotor 25 of 45° either clockwise or counterclockwise will again allow current to flow through the switch 17, as reference to Fig. 15 will show. This movement of the rotor 25 would be brought about by the engaging of the lever 41 with the downward extending trip 23ª as the car passes the cross wire upon which the trip is supported.

Assuming now that the car should reverse in its direction, as for instance, the backing up for a distance and in so backing up should pass one of the stations which has been already indicated through the opening 5, the lever 41 of the trolley switch would be moved by the trip 23ª in a direction opposite to that which it has been moved in the subsequent engagement with the trip 23ª. This engagement with the trip in the opposite direction would cause the rotor 25 to turn approximately 45° and carry with it by means of the frictionally engaged plates 59, the rotor 50. The rotor 50 has on its surface, plates 51 and 52 which constitute a reversing switch and a movement of the rotor in the opposite direction would bring these plates in engagement with the spring contacts 53 to 56 inclusive in the manner shown in Fig. 16. This would cause the motor 13 to reverse in its direction and the roller 11 would be turned in place of the roller 12. The belt 10 of course would move back until the next name would be visible through the opening 5. This would repeat itself as long as the car ran in the reverse direction, that is every time the trolley switch 22 was actuated by the trip 23ª, the belt would move back, displaying another name through the opening 5.

Supposing now that the car or train is approaching a dangerous crossing, the belt 10, having previously been prepared by removing of insulation from the end of the strips 65 adjacent the name designating the crossing, would cause a shorting of the contacts 68 and 70, as the strip 65 passed therethrough, and a light 71 would burn so that the motorman would have notice of the dangerous crossing ahead.

I make use of the reversing switch 63 when it is necessary to move the belt back to calibrate the device, such as would be necessary if the panel bearing the belt and its associate mechanism is installed in the car at a transfer station or starting depot and the name appearing in the opening 5 does not register with the station at which the panel is applied. I thus provide means for manually setting the device to register properly with the stations or stops. Further means of accomplishing this end is provided in the knife switch 64 which must be used in conjunction with the reverse switch 63 when the reading on the belt is more than one station out of register.

It is to be observed that a mounting board 1 is secured at each end of the car. Now when the car has made its last stop and is ready to start back, the panel 3, carrying with it the indicating mechanism, is placed on the mounting board 1 situated at the other end of the car. The wires leading to the spring contact members 2 in this mounting board are so arranged as to automatically reverse the belt 10 without the necessity of operating the reverse switch 63. As heretofore described, the reverse switch 63 is only used when reversing the belt for a short distance, or when the car takes a turn and starts on its return trip without reversing the direction of the car itself. In this instance the panel 3 still remains at the same end of the car and the movement of the belt 10 is reversed by the reversing switch 63.

I claim:

1. The combination with a vehicle of a belt carried thereby, said belt having names of streets and stations inscribed thereon, an electric motor for moving said belt, a trolley switch mechanism, an auxiliary two-way switch and a reversing switch, said auxiliary switch and reversing switch acting conjointly with said trolley switch mechanism for actuating said motor.

2. The combination with a vehicle of a belt carried thereby, said belt having names of streets and stations inscribed thereon, an electric motor for moving said belt, a trolley switch mechanism comprising a two-way switch and a reversing switch, and an auxiliary two-way switch acting conjointly with said two-way switch and said reversing switch for actuating said motor.

3. The combination with a vehicle of a belt carried thereby, said belt having names of streets and stations inscribed thereon, an electric motor for moving said belt, a trolley switch mechanism comprising a two-way switch and a reversing switch, an auxiliary two-way switch, and an auxiliary reversing switch acting conjointly with said auxiliary two-way switch and said trolley switch mechanism for actuating said motor.

JOHN F. HALVERSON.